United States Patent
Sasagawa et al.

(10) Patent No.: US 7,696,267 B2
(45) Date of Patent: Apr. 13, 2010

(54) ASPHALT COMPOSITION CONTAINING HYDROGENATED CONJUGATED DIENE COPOLYMER

(75) Inventors: Masahiro Sasagawa, Yokohama (JP); Toshinori Shiraki, Yamato (JP); Shigeo Nakajima, Fujisawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 11/727,839

(22) Filed: Mar. 28, 2007

(65) Prior Publication Data
US 2007/0179220 A1 Aug. 2, 2007

Related U.S. Application Data

(63) Continuation of application No. 10/968,241, filed on Oct. 20, 2004, now abandoned.

(30) Foreign Application Priority Data
Oct. 21, 2003 (JP) .............................. 2003-360956

(51) Int. Cl.
C08L 95/00 (2006.01)
C08F 36/00 (2006.01)
C08F 8/00 (2006.01)

(52) U.S. Cl. ...................... 524/59; 525/332.9; 525/338; 525/500

(58) Field of Classification Search ................... 524/59; 525/332.9, 338, 500
See application file for complete search history.

(56) References Cited

U.S. PATENT DOCUMENTS

| 4,145,322 | A | 3/1979 | Maldonado et al. |
| 5,508,112 | A | 4/1996 | Planche et al. |
| 6,120,913 | A | 9/2000 | Kluttz |
| 6,329,459 | B1 * | 12/2001 | Kang et al. .................. 524/505 |
| 6,653,408 | B1 * | 11/2003 | St. Clair .................. 525/327.8 |
| 6,833,411 | B2 | 12/2004 | Fujiwara et al. |
| 2003/0149140 | A1 | 8/2003 | Stephens et al. |
| 2004/0039128 | A1 * | 2/2004 | Sasagawa et al. ........ 525/331.9 |

FOREIGN PATENT DOCUMENTS

| JP | 57-24385 | 2/1982 |
| JP | 3-501035 | 3/1991 |
| JP | 2001-325476 | * 10/2001 |
| WO | 03/035705 | 5/2003 |
| WO | WO 03035705 | * 5/2003 |

* cited by examiner

*Primary Examiner*—William K Cheung
(74) *Attorney, Agent, or Firm*—Staas & Halsey LLP

(57) ABSTRACT

An asphalt composition comprising from 0.5 to 50 parts by weight of a hydrogenated conjugated diene copolymer (a) and 100 parts by weight of asphalt (b), wherein the hydrogenated conjugated diene copolymer (a) comprises a polymer block (A) comprising vinyl aromatic monomer units and at least one hydrogenated copolymer block (B) obtained by hydrogenation of a non-hydrogenated random copolymer block comprising conjugated diene monomer units and vinyl aromatic monomer units, the hydrogenated conjugated diene copolymer (a) having the following characteristics (1) to (5):

(1) the content of the vinyl aromatic monomer units is more than 30% and not more than 60% by weight per weight of the hydrogenated conjugated diene copolymer;
(2) the content of the polymer block (A) is from 5% to 50% by weight per weight of the hydrogenated copolymer;
(3) the weight average molecular weight is from 30,000 to 500,000;
(4) the percentage of hydrogenation of the double bonds in the conjugated diene monomer units is from 60% to 100%; and
(5) at least one peak of the loss tangent (tan δ) is present in the range of from −40° C. to less than −10° C. in a dynamic viscoelastic spectrum obtained with respect to the hydrogenated copolymer.

14 Claims, No Drawings

ASPHALT COMPOSITION CONTAINING HYDROGENATED CONJUGATED DIENE COPOLYMER

CROSS REFERENCE TO RELATED APPLICATION

This application is a continuation of parent U.S. patent application Ser. No. 10/968,241 filed Oct. 20, 2004 now abandoned incorporated herein by reference in its entirety. This continuation application claims the priority of the parent U.S. patent application Ser. No. 10/968,241. This continuation application also claims the priority of Japanese Patent Application No. 2003-360956, filed on Oct. 21, 2003, in the Japanese Patent Office, the disclosure of which is incorporated herein by reference in its entirety.

BACKGROUND OF THE INVENTION (1) Field of the Invention

The present invention relates to an asphalt composition containing a hydrogenated conjugated diene copolymer with a specific structure. More particularly, the present invention relates to an asphalt composition comprising 0.5 to 50 parts by weight of a hydrogenated conjugated diene copolymer (a) and 100 parts by weight of asphalt (b), wherein the above described hydrogenated conjugated diene copolymer (a) comprises a polymer block (A) comprising vinyl aromatic monomer units and at least one hydrogenated copolymer block (B) obtained by hydrogenation of a non-hydrogenated random copolymer block comprising conjugated diene monomer units and vinyl aromatic monomer units, the above described hydrogenated conjugated diene copolymer (a) having the following characteristics (1) to (5):

(1) the content of the above described vinyl aromatic monomer units is more than 30% and not more than 60% by weight per weight of the above described hydrogenated conjugated diene copolymer;

(2) the content of the above described polymer block (A) is from 5% to 50% by weight per weight of the above described hydrogenated copolymer;

(3) the weight average molecular weight is from 30,000 to 500,000;

(4) the percentage of hydrogenation of the double bonds in the above described conjugated diene monomer units is from 60% to 100%; and (5) at least one peak of the loss tangent (tan δ) is present in the range of from −40° C. to less than −10° C. in a dynamic viscoelastic spectrum obtained with respect to the above described hydrogenated copolymer.

The asphalt composition of the present invention has high softening point, modulus and elongation and is excellent in high-temperature storage stability. In particular, the asphalt composition has extremely high softening point and modulus even when it contains a low content of the hydrogenated copolymer. Furthermore, the asphalt composition has excellent high-temperature storage stability even when it contains a high content of the hydrogenated copolymer. The asphalt composition of the present invention can be suitably utilized for road pavement, roofings/waterproof sheets and sealants, by making the most of such characteristics. In addition, the asphalt composition is very suitable for roofing shingles since it is also excellent in weatherability in addition to the above characteristics.

(2) Description of Related Art

Asphalt compositions have been widely used for applications such as road pavement, waterproof sheets, sound isolation sheets, and roofings. Various attempts have been made to improve the properties by adding various polymers to asphalt. Specific examples of these polymers include ethylene-vinyl acetate copolymers, ethylene-ethyl acrylate copolymers, rubber latexes, block copolymers consisting of conjugated dienes, and vinyl aromatic hydrocarbons and the like.

In recent years, there is an increasing demand for asphalt mixtures with excellent strength and abrasion resistance associated with circumstances such as the increase or speedup of vehicles passing through roads. This requires a higher softening point and mechanical strength such as modulus, and the improvement of these strength properties has been attempted, for example, by increasing the molecular weight of the above block copolymers. However, the asphalt composition obtained according to such a method does not provide sufficient storage stability during high-temperature storage, resulting in separation of polymers from the asphalt composition, increase in melt viscosity and reduction of workability for road pavement.

Consequently, the improvement of storage stability has been generally attempted by adding an aromatic oil or crosslinking by adding sulfur or peroxides. For example, JP-B-57-24385 (corresponding to U.S. Pat. No. 4,145,322) discloses the use of sulfur, and JP-A-03-501035 (corresponding to U.S. Pat. No. 5,508,112) discloses the combination of sulfur, a vulcanizing agent and a vulcanization accelerator containing sulfur. However, such improvement methods have not yet provided adequate results and a further improvement has been desired.

In addition, US Patent No. 2003/0149140 discloses an asphalt composition using a copolymer consisting of a conjugated diene with a special structure and a vinyl aromatic hydrocarbon. However, the above described composition is inadequate in the balance of the softening point, modulus, and high-temperature storage stability and is poor in weatherability and low-temperature characteristics. Therefore, a further improvement has been desired.

In addition, U.S. Pat. No. 6,120,913 discloses an asphalt composition for roofing shingles comprising a block copolymer consisting of a vinyl aromatic hydrocarbon and a conjugated diene and fillers. However, since the above described composition uses a common block copolymer consisting of a vinyl aromatic hydrocarbon and a conjugated diene, it is inadequate in high-temperature storage stability and poor in weatherability, therefore, a further improvement has been desired for use in roofing shingles.

SUMMARY OF THE INVENTION

Under these circumstances, the present inventors have conducted intensive investigations on the improvement in characteristics of a composition comprising a hydrogenated conjugated diene copolymer and asphalt in order to solve the above problems in the prior art. As a result, the present inventors have found that an asphalt composition containing a hydrogenated conjugated diene copolymer has high softening point, modulus and elongation and is excellent in high-temperature storage stability, wherein the hydrogenated conjugated diene copolymer comprises a polymer block (A) comprising vinyl aromatic monomer units and at least one hydrogenated copolymer block (B) obtained by hydrogenation of a non-hydrogenated random copolymer block comprising conjugated diene monomer units and vinyl aromatic monomer units, the hydrogenated conjugated diene copolymer having the following characteristics: (1) the content of the above described vinyl aromatic monomer units is from 30% to 60% by weight per weight of the above described hydrogenated copolymer; (2) the content of the above described polymer block (A) is from 5% to 50% by weight per weight of the above described hydrogenated copolymer; (3) the weight average molecular weight is from 30,000 to 500,000; (4) the percentage of hydrogenation of the double bonds in the above described conjugated diene monomer units is from 60% to 100%; and (5) at least one peak of the loss tangent (tan δ) is present in the range of from −40° C. to less than −10° C. in a dynamic viscoelastic spectrum obtained with respect to the above described hydrogenated copolymer. The present invention has been completed based on these findings.

Thus, it is an object of the present invention to provide an asphalt composition having high softening point, modulus and elongation and excellent in high-temperature storage stability. In addition, the amount of expensive modified polymers to be used can be reduced, since an asphalt composition having extremely high softening point and modulus can be obtained even when it contains a low content of the hydrogenated copolymer. Furthermore, the asphalt composition of the present invention can be applied to roofing shingle applications where suitable polymers have not been found, since this asphalt composition is excellent not only in high-temperature storage stability, but also in heat resistance, weatherability and the like.

These and other objects, features and advantages of the present invention will become apparent from the detailed description and claims which follow.

The present invention provides an asphalt composition comprising from 0.5 to 50 parts by weight of a hydrogenated copolymer (a) and 100 parts by weight of asphalt (b). Here, the above described hydrogenated conjugated diene copolymer (a) includes a polymer block (A) including vinyl aromatic monomer units and at least one hydrogenated copolymer block (B) obtained by hydrogenation of a non-hydrogenated random copolymer block including conjugated diene monomer units and vinyl aromatic monomer units, and it has the following characteristics (1) to (5):

(1) the content of the above described vinyl aromatic monomer units is from 30% to 60% by weight per weight of the above described hydrogenated copolymer;

(2) the content of the above described polymer block (A) is from 5% to 50% by weight per weight of the above described hydrogenated copolymer;

(3) the weight average molecular weight is from 30,000 to 500,000;

(4) the percentage of hydrogenation of the double bonds in the above described conjugated diene monomer units is from 60% to 100%; and (5) at least one peak of the loss tangent (tan δ) is present in the range of from −40° C. to less than −10° C. in a dynamic viscoelastic spectrum obtained with respect to the above described hydrogenated copolymer.

The basic features and preferable aspects of the present invention are listed below to facilitate understanding of the present invention.

An asphalt composition has from 0.5 to 50 parts by weight of a hydrogenated conjugated diene copolymer (a) and 100 parts by weight of asphalt (b), where the hydrogenated conjugated diene copolymer (a) includes a polymer block (A) including vinyl aromatic monomer units and at least one hydrogenated copolymer block (B) obtained by hydrogenation of a non-hydrogenated random copolymer block including conjugated diene monomer units and vinyl aromatic monomer units, and the hydrogenated conjugated diene copolymer (a) has the following characteristics (1) to (5):

(1) the content of the above described vinyl aromatic monomer units is more than 30% and not more than 60% by weight per weight of the above described hydrogenated conjugated diene copolymer;

(2) the content of the above described polymer block (A) is from 5% to 50% by weight per weight of the above described hydrogenated copolymer;

(3) the weight average molecular weight is from 30,000 to 500,000;

(4) the percentage of hydrogenation of the double bonds in the above described conjugated diene monomer units is from 60% to 100%; and (5) at least one peak of the loss tangent (tan δ) is present in the range of from −40° C. to less than −10° C. in a dynamic viscoelastic spectrum obtained with respect to the above described hydrogenated copolymer.

Preferably, the hydrogenated conjugated diene copolymer (a) does not substantially have a crystallization peak in the range of from −20° C. to 80° C. in the chart of differential scanning calorimetry (DSC).

Furthermore, the content of the vinyl aromatic monomer units in the hydrogenated conjugated diene copolymer (a) is more preferably more than 40% and not more than 60% by weight per weight of the above described hydrogenated conjugated diene copolymer (a).

In addition, the hydrogenated copolymer block in the hydrogenated conjugated diene copolymer (a) is preferably a hydrogenated copolymer block obtained by hydrogenation of a non-hydrogenated random copolymer block with a tapered structure.

The hydrogenated conjugated diene copolymer (a) may have at least two polymer blocks (A) including vinyl aromatic monomer units.

The hydrogenated conjugated diene copolymer (a) preferably has a molecular weight distribution (Mw/Mn) of from 1.1 to 5.

The hydrogenated conjugated diene copolymer (a) may be a modified hydrogenated copolymer to which an atomic group having a functional group is bonded. 8. The asphalt composition may be used in a roofing shingle.

DETAILED DESCRIPTION OF THE INVENTION

The hydrogenated conjugated diene copolymer (a) used in the present invention is obtained by hydrogenation of a non-hydrogenated copolymer comprising conjugated diene monomer units and vinyl aromatic monomer units (hereinafter often referred to as "a base non-hydrogenated copolymer"). The hydrogenated conjugated diene copolymer (a) of the present invention comprises a polymer block (A) comprising vinyl aromatic monomer units and at least one hydrogenated copolymer block (B) obtained by hydrogenation of a non-hydrogenated random copolymer block comprising conjugated diene monomer units and vinyl aromatic monomer units.

The content of vinyl aromatic monomer units in the hydrogenated conjugated diene copolymer (a) used in the present invention is more than 30% and not more than 60% by weight relative to the hydrogenated copolymer. An asphalt composition excellent in softening point and modulus can be obtained since the content of vinyl aromatic monomer units in the hydrogenated conjugated diene copolymer (a) is in the above-described range. In view of the balance of a softening point, modulus, elongation and the like, the content of the vinyl aromatic monomer units is preferably more than 35% and not more than 58%, more preferably more than 40% and not more than 55%, most preferably not less than 41% and not more than 53%, by weight.

Since the content of the vinyl aromatic monomer units relative to the hydrogenated conjugated diene copolymer is almost equal to that of the vinyl aromatic monomer units relative to the base non-hydrogenated copolymer, the content of the vinyl aromatic monomer units relative to the hydrogenated copolymer is determined relative to the base-non hydrogenated copolymer. The content of the vinyl aromatic monomer units relative to the hydrogenated conjugated diene copolymer is determined by means of an ultraviolet spectrophotometer using the base non-hydrogenated copolymer as a specimen.

In the hydrogenated conjugated diene copolymer (a) used in the present invention, the content of the polymer block (A) is from 5% to 50% by weight relative to the hydrogenated copolymer. An asphalt composition excellent in softening point can be obtained since the content of the polymer block (A) in the hydrogenated conjugated diene copolymer (a) is in the above-described range. In view of the softening point and high-temperature storage stability of the asphalt composition, the content of the polymer block (A) is preferably from 8% to 40%, more preferably from 10% to 35%, even more preferably from 12% to 30%, and most preferably from 14% to 25%, by weight. In particular, a higher content of the polymer block (A) is preferred in order to obtain an asphalt composition with a higher softening point by incorporating a high content of the hydrogenated copolymer into the composition.

In the present invention, since the content of the polymer block (A) relative to the hydrogenated conjugated diene copolymer is almost equal to that of the polymer block (A) relative to the base non-hydrogenated copolymer, the content of the polymer block (A) is determined as that of the polymer block (A) relative to the base non-hydrogenated copolymer. Specifically, the weight of the vinyl aromatic polymer block component (however, the vinyl aromatic polymer component with an average degree of polymerization of about 30 or less is excluded) is determined by a method for oxidatively decomposing the base non-hydrogenated copolymer with tertiary-butyl hydroperoxide using osmium tetroxide as a catalyst (a method described in I. M. KOLTHOFF, et al., J. Polym. Sci., 1, 429 (1946), hereinafter often referred to as the "osmium tetroxide decomposition method"), which is used to determine the content according to the following expression:

Content of vinyl aromatic polymer block (A) (wt %)= (weight of vinyl aromatic polymer block (A) in base non-hydrogenated copolymer/weight of base non-hydrogenated copolymer)×100.

Alternatively, the content of the polymer block (A) relative to the hydrogenated conjugated diene copolymer (a) can be directly measured by means of a nuclear magnetic resonance apparatus (NMR) using the hydrogenated conjugated diene copolymer as a specimen (a method described in Y. Tanaka, et al., RUBBER CHEMISTRY and TECHNOLOGY, 54, 685 (1981); hereinafter referred to as the "NMR method").

There is a correlation between the content of the polymer block (A) determined by the above described osmium tetroxide decomposition method (referred to as the "Os value") and that of the polymer block (A) determined by the above described NMR method (referred to the "NS value"). As a result of the study by the present inventors using various copolymers, it has been found that the correlation can be represented by the following expression:

Os value=−0.012 (Ns value)$^2$+1.8 (Ns value)−13.0

Therefore, when the content of the polymer block (A) relative to the hydrogenated copolymer is determined by the NMR method in the present invention, the Ns value is converted to the Os value.

The hydrogenated conjugated diene copolymer (a) used in the present invention has a weight average molecular weight of from 30,000 to 500,000. The weight average molecular weight of the hydrogenated conjugated diene copolymer in the above described range can provide an asphalt composition with good asphalt characteristics such as a softening point and excellent handling properties (low viscosity). In view of the balance of asphalt characteristics and handling properties, the hydrogenated conjugated diene copolymer (a) used in the present invention has a weight average molecular weight of preferably from 50,000 to 400,000, more preferably from 70,000 to 300,000, and most preferably from 80,000 to 250, 000.

The hydrogenated conjugated diene copolymer (a) used in the present invention has a molecular weight distribution (Mw/Mn) (the ratio of the weight average molecular weight (Mw) to the number average molecular weight (Mn)) of preferably 10 or less, more preferably from 1.01 to 8, and most preferably from 1.1 to 5. When emphasis is placed on handling properties, the ratio is preferably from 1.1 to 5 and more preferably from 1.2 to 5.

Since the weight average molecular weight of the hydrogenated conjugated diene copolymer (a) is almost equal to that of the base non-hydrogenated copolymer, the weight average molecular weight of the hydrogenated conjugated diene copolymer (a) is determined as that of the base non-hydrogenated copolymer. The weight average molecular weight of the base non-hydrogenated copolymer is determined by gel permeation chromatography (GPC) using a calibration curve obtained from a commercially available standard monodisperse polystyrene with a known molecular weight. The number average molecular weight of the hydrogenated conjugated diene copolymer (a) is also determined in the same manner. The molecular weight distribution is determined by calculating a ratio of the weight average molecular weight to the number average molecular weight.

The hydrogenated conjugated diene copolymer (a) used in the present invention is obtained by hydrogenation of a non-hydrogenated copolymer (that is, a base non-hydrogenated copolymer) comprising conjugated diene monomer units and vinyl aromatic monomer units. The percentage of hydrogenation of the double bonds in the conjugated diene monomer units of the hydrogenated conjugated diene copolymer (a) is from 60% to 100%. The percentage of hydrogenation of the hydrogenated copolymer is preferably from 70% to 100%, more preferably from 75% to 100%, and most preferably from 90% to 100%, in view of the softening point, modulus and high-temperature storage stability of the asphalt composition.

The percentage of hydrogenation of the double bonds in the vinyl aromatic monomer units of the hydrogenated conjugated diene copolymer (a) is not particularly limited, but is preferably 50% or less, more preferably 30% or less, and most preferably 20% or less.

The above described percentage of hydrogenation in the hydrogenated conjugated diene copolymer can be determined by means of a nuclear magnetic resonance apparatus.

At least one peak of the loss tangent (tan δ) is present in the range of from −40° C. to less than −10° C., preferably from −38° C. to −11° C., and more preferably from −30° C. to −14° C., in a dynamic viscoelastic spectrum obtained with respect to the hydrogenated conjugated diene copolymer (a) used in the present invention. The loss tangent peak present in the range of from −40° C. to less than −10° C. is a peak attributable to the hydrogenated copolymer block (B) (a hydrogenated polymer block obtained by hydrogenation of a non-hydrogenated random copolymer block comprising conjugated diene monomer units and vinyl aromatic monomer units). The presence of the at least one peak of the loss tangent in the range of from −40° C. to less than −10° C. is necessary for the balance of the softening point, modulus, high-temperature storage stability and the like of an asphalt composition, and it is also important in view of the low temperature characteristics. In the present invention, the presence of the peak of the loss tangent attributable to the polymer block (A) is not particularly limited, but the peak of the loss tangent attributable to the polymer block (A) is generally present in a temperature range of from more than 80° C. to 150° C.

The peak of the loss tangent (tan δ) in the dynamic viscoelastic spectrum is measured by means of a viscoelasticity measurement and analysis apparatus using a frequency of 10 Hz.

As described above, the hydrogenated copolymer block (B) is obtained by hydrogenation of a non-hydrogenated random copolymer block comprising conjugated diene monomer units and vinyl aromatic monomer units. The weight ratio of the conjugated diene monomer units/vinyl aromatic monomer units in the above described non-hydrogenated random copolymer is not particularly limited. However, taking consideration that at least one peak of the loss tangent needs to be present in the range of from −40° C. to less than −10° C. as described above, it is recommended that the weight ratio of the conjugated diene monomer units/vinyl aromatic monomer units is preferably from 50/50 to 90/10, more preferably from 53/47 to 80/20, most preferably 56/44 to 75/25.

As described above, the hydrogenated copolymer block (B) is obtained by hydrogenation of a non-hydrogenated random copolymer block comprising conjugated diene monomer units and vinyl aromatic monomer units. The microstructure (the ratio of cis- and trans-vinyl) of the conjugated diene monomer units in the above described non-hydrogenated random copolymer can be freely changed by using a polar compound or the like to be described below. In the present invention, the vinyl bond content in the conjugated diene monomer units in the non-hydrogenated random copolymer block comprising conjugated diene monomer units and vinyl aromatic monomer units is not particularly limited, but it is recommended to be from 10% to 50%. Hereinafter, the sum of the content of the 1,2-vinyl bond and 3,4-vinyl bond (however, the content of the 1,2-vinyl bond when 1,3-butadiene is used as the conjugated diene) is simply referred to as the vinyl bond content. The above described vinyl bond content is determined by means of an infrared spectrophotometer using the base non-hydrogenated copolymer as a specimen.

The hydrogenated conjugated diene copolymer (a) with any structure may be used in the present invention. One aspect of the structure of the hydrogenated conjugated diene copolymer (a) of the present invention includes a hydrogenated copolymer comprising at least one hydrogenated copolymer block (B) and at least one polymer block (A). Examples of these hydrogenated copolymers include those with the structures represented by the following formulas:

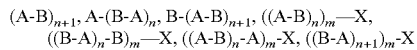

(wherein each A independently denotes a polymer block comprising vinyl aromatic monomer units; each B independently denotes a hydrogenated copolymer block obtained by hydrogenation of a non-hydrogenated random copolymer comprising conjugated diene monomer units and vinyl aromatic monomer units; each n independently denotes an integer of 1 or more, preferably an integer of from 1 to 5; each m independently denotes an integer of 2 or more, preferably an integer of from 2 to 11; each X independently denotes a residue of a coupling agent or a residue of a multifunctional initiator.)

The above described examples preferably have two or more polymer blocks (A), and the A-B-A structure is particularly preferred. The hydrogenated copolymer having two or more polymer blocks (A) will provide an asphalt composition with high softening point and modulus.

In the hydrogenated conjugated diene copolymer (a) used in the present invention, the vinyl aromatic monomer units in the hydrogenated copolymer block B obtained by hydrogenation of a non-hydrogenated random copolymer may be distributed homogeneously or in a tapered form (tapered structure). Here, the tapered structure means a structure in which the content of the vinyl aromatic monomer units gradually increases along a polymer chain in B. This is a structure in which the relationship of (S2/S1)>1 and (S3/S2)>1 is established, wherein S1 denotes the amount of vinyl aromatics in a copolymer immediately after starting polymerization of the block B; S2 denotes the amount of vinyl aromatics in a copolymer in the course of polymerization, for example, when ½ of the monomer introduced is polymerized; and S3 denotes the amount of vinyl aromatics in a copolymer after completion of polymerization. The hydrogenated conjugated diene copolymer with the block B of a tapered structure is preferred in view of the softening point for an asphalt composition.

Moreover, the hydrogenated copolymer block B may comprise a plurality of parts where the vinyl aromatic monomer units are homogeneously distributed and/or a plurality of parts where the vinyl aromatic monomer units are distributed in a tapered form. In addition, the hydrogenated copolymer block B may comprise a plurality of segments with a different content of the vinyl aromatic monomer units.

The hydrogenated conjugated diene copolymer used in the present invention may be any mixture of those having a structure represented by the above described formulas.

The hydrogenated conjugated diene copolymer (a) used in the present invention preferably does not substantially have a crystallization peak attributable to the hydrogenated copolymer block (B) in the range of from −20° C. to 80° C. in the chart of differential scanning calorimetry (DSC) obtained. Here, "not substantially have a crystallization peak attributable to the hydrogenated copolymer block (B) in the range of from −20° C. to 80° C." means that the peak attributable to the hydrogenated copolymer block (B) is not observed in this temperature range; or the peak attributable to the crystallization is observed, but the heat of crystallization peak due to the crystallization is less than 3 J/g, preferably less than 2 J/g, more preferably less than 1 J/g, and most preferably the heat of crystallization peak is almost zero. The hydrogenated conjugated diene copolymer which does not substantially have a crystallization peak attributable to the hydrogenated copolymer block (B) in the range of from −20° C. to 80° C. in the chart of differential scanning calorimetry (DSC) provides an asphalt composition which is excellent particularly in high-temperature storage stability and elongation. The hydrogenated copolymer which does not substantially have a crystallization peak attributable to the hydrogenated copolymer block (B) in the range of from −20° C. to 80° C. as described above is obtained by hydrogenation of a non-hydrogenated copolymer which is obtained by undergoing a polymerization reaction under conditions to be described below using a modifier to be described below for controlling the vinyl bond content and a modifier to be described below for adjusting the random copolymerization between a conjugated diene and a vinyl aromatic compound.

The temperature and heat of crystallization peak can be measured by means of a differential scanning calorimeter.

In the hydrogenated conjugated diene copolymer (a) of the present invention, the conjugated diene is a diolefin with a pair of conjugated double bonds. Examples of the conjugated diene include 1,3-butadiene, 2-methyl-1,3-butadiene (i.e., isoprene), 2,3-dimethyl-1,3-butadiene, 1,3-pentadiene, 2-methyl-1,3-pentadiene and 1,3-hexadiene. 1,3-Butadiene and isoprene are most preferable among them. These may be used individually or in combination of two or more.

Moreover, examples of the vinyl aromatic compound include styrene, α-methylstyrene, p-methylstyrene, divinylbenzene, 1,1-diphenylethylene, N,N-dimethyl-p-aminoethyl styrene, N,N-diethyl-p-aminoethyl styrene. These may be used individually or in combination of two or more.

As described above, the hydrogenated conjugated diene copolymer (a) is obtained by hydrogenation of a non-hydrogenated copolymer comprising conjugated diene monomer units and vinyl aromatic monomer units. The method for producing the non-hydrogenated copolymer is not particularly limited, but a known method may be used. For example, it may be produced by anion living polymerization using a polymerization initiator such as an organic alkali metal compound or the like in a hydrocarbon solvent. Examples of the hydrocarbon solvent include aliphatic hydrocarbons such as n-butane, isobutane, n-pentane, n-hexane, n-heptane and n-octane; cycloaliphatic hydrocarbons such as cyclohexane, cycloheptane and methylcycloheptane; and aromatic hydrocarbons such as benzene, toluene, xylene and ethylbenzene.

Examples of the polymerization initiator include aliphatic hydrocarbon alkali metal compounds, aromatic hydrocarbon alkali metal compounds and organic amino alkali metal compounds, which have the activity of anion polymerization to conjugated dienes and vinyl aromatic compounds. Examples of alkali metals include lithium, sodium and potassium. Examples of suitable organic alkali metal compounds include aliphatic and aromatic hydrocarbon lithium compounds having from 1 to 20 carbon atoms and including at least one lithium in a molecule (monolithium compounds, dilithium compounds, trilithium compounds, tetralithium compounds and the like). Specifically, these compounds include n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, a reaction product of divinylbenzene, sec-butyllithium and a small amount of 1,3-butadiene and the like. In addition, organic alkali metal compounds disclosed in U.S. Pat. No. 5,708,092, GB Patent No. 2,241,239, U.S. Pat. No. 5,527,753 and the like can also be used.

Also, it is noted that free-radical and n-butyllithium-prepared polystyrenes have essentially atactic structures with meso additions favored over racemic additions by approximately 55.45. See J. Randall, The distribution of stereochemical configurations in polystyrene as observed with 13C NMR, Journal of Polymer Science: Polymer Physics Edition, John Wiley & Sons (1975), (online Mar. 11, 2003).

When a conjugated diene monomer and a vinyl aromatic monomer are copolymerized using an organic alkali metal compound as a polymerization initiator in the present invention, a tertiary amine compound or an ether compound may be added as a modifier for adjusting the content of the vinyl bond (a 1,2-vinyl bond or a 3,4-vinyl bond) derived from conjugated diene monomer units to be incorporated into a polymer or for adjusting the random copolymerization between a conjugated diene and a vinyl aromatic compound.

Examples of the tertiary amine compound include compounds represented by the formula: $R^1R^2R^3N$ (wherein $R^1$, $R^2$ and $R^3$ each independently represent a hydrocarbon group having from 1 to 20 carbon atoms or a hydrocarbon group having a tertiary amino group). Specifically, these compounds include trimethylamine, triethylamine, tributylamine, N,N-dimethylaniline, 00N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine, N,N'-dioctyl-p-phenylenediamine and the like.

Examples of the ether compound include straight chain ether compounds and cyclic ether compounds. Examples of the straight chain ether compounds include dimethyl ether, diethyl ether, diphenyl ether; dialkyl ether compounds of ethylene glycol such as ethylene glycol dimethyl ether, ethylene glycol diethyl ether and ethylene glycol dibutyl ether; and dialkyl ether compounds of diethylene glycol such as diethylene glycol dimethyl ether, diethylene glycol diethyl ether and diethylene glycol dibutyl ether. Furthermore, examples of the cyclic ether compounds include tetrahydrofuran, dioxane, 2,5-dimethyloxolane, 2,2,5,5-tetramethyloxolane, 2,2-bis(2-oxolanyl)propane and alkyl ethers of furfuryl alcohol.

The method for copolymerizing a conjugated diene monomer and a vinyl aromatic monomer using an organic alkali metal compound as a polymerization initiator in the present invention may be by batch polymerization or continuous polymerization or a combination of the two. The polymerization temperature is generally from 0° C. to 180° C., preferably from 30° C. to 150° C. The time required for the polymerization may vary depending on other conditions, but is generally within 48 hours, preferably from 0.1 to 10 hours. The atmosphere of the polymerization system is preferably an inactive gas atmosphere such as nitrogen gas. The polymerization pressure is not particularly limited as long as it is within a range sufficient enough to keep monomers and a solvent in a liquid phase in the above described polymerization temperature range. Moreover, it should be noted that impurities (such as water, oxygen and carbon dioxide), which will inactivate catalysts and living polymers, are not mixed into the polymerization system.

In the present invention, a coupling reaction can also be performed using a coupling agent with two or more functionalities at the time of completion of the above described polymerization. The coupling agent with two or more functionalities is not limited, but known ones may be used. Examples of the coupling agents with two functionalities include dihalogen compounds such as dimethyldichlorosilane and dimethyldibromosilane; and acid esters such as methyl benzoate, ethyl benzoate, phenyl benzoate and phthalates. Examples of multifunctional coupling agents with three or more functionalities include tri- or more hydric polyalcohols; polyepoxy compounds such as epoxidized soybean oils and diglycidyl bisphenol A; and polyhalogen compounds such as halogenated silicon compounds represented by the formula: $R_{4-n}SiX_n$ (wherein R each independently denotes a hydrocarbon group having from 1 to 20 carbon atoms; X denotes each independently a halogen atom; and n denotes 3 or 4), for example, methylsilyl trichloride, t-butylsilyl trichloride, silicon tetrachloride, and bromides thereof; and halogenated tin compounds represented by the formula: $R_{4-n}SnX_n$ (wherein R each independently denotes a hydrocarbon group having from 1 to 20 carbon atoms; X denotes each independently a halogen atom; and n denotes 3 or 4), for example, methyltin trichloride, t-butyltin trichloride, tin tetrachloride. In addition, dimethyl carbonate and diethyl carbonate may be used as a multifunctional coupling agent.

In the hydrogenated conjugated diene copolymer (a) to be used in the present invention, a modified hydrogenated conjugated diene copolymer to which at least one atomic group having a functional group is bonded may be used. The atomic group having a functional group includes an atomic group containing at least one functional group selected from, for example, a hydroxy group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a nitrile group, a pyridyl group, a quinoline group, an epoxy group, a thioepoxy group, a sulfide group, an isocyanate group, an isothiocyanate group, a halogenated silicon group, a silanol group, an alkoxysilane group, a halogenated tin group, an alkoxytin group, a phenyltin group and the like. The hydrogenated conjugated diene copolymer is obtained by hydrogenation of the modified conjugated diene copolymer obtained by reacting a compound that forms or contains such a functional group-containing atomic group with a conjugated diene copolymer when polymerization of the conjugated diene copolymer is completed.

The modified hydrogenated conjugated diene copolymer that can be used in the present invention is preferably a modified hydrogenated conjugated diene copolymer to which an atomic group having at least one functional group selected from a hydroxy group, an epoxy group, an amino group, a silanol group and an alkoxysilane group is bonded.

In the present invention, for example, terminal-treating agents described in JP-B-04-39495 (corresponding to U.S. Pat. No. 5,115,035) can be used as the compounds with the above described functional groups. Specifically, the terminal-treating agents include tetraglycidylmetaxylenediamine, tetraglycidyl-1,3-bisaminomethylcyclohexane, ε-caprolactone, 4-methoxybenzophenone, γ-glycidoxyethyltrimethoxysilane, γ-glycidoxybutyltrimethoxysilane, γ-glycidoxypropyltriphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, N-methylpyrrolidone and the like.

The modified hydrogenated conjugated diene copolymer that can be used in the present invention is obtained in the manner as described below. That is, a modifier that forms or contains a functional group is subjected to an addition reaction to a living terminal of a conjugated diene polymer obtained in the process as described above using an organolithium compound as a polymerization catalyst to obtain a modified conjugated diene copolymer to which at least one atomic group having at least one functional group selected from a hydroxy group, an epoxy group, an amino group, a silanol group and an alkoxysilane is bonded. Hydrogen can be added to the modified conjugated diene copolymer to obtain the modified hydrogenated conjugated diene copolymer. An alternative method for obtaining the modified hydrogenated conjugated diene copolymer includes a method in which a conjugated diene copolymer is allowed to react with an organic alkali metal compound such as an organolithium compound (metalation reaction) and a polymer to which an organic alkali metal is added is allowed to react with a modifier containing a functional group in an addition reaction. In the latter case, the modified hydrogenated conjugated diene copolymer can also be obtained by subjecting the conjugated diene copolymer to the metalation reaction followed by reaction with the modifier after obtaining a hydrogenated product of the copolymer.

In any modification method as described above for obtaining the modified hydrogenated conjugated diene copolymer that can be used in the present invention, the reaction temperature is preferably from 0° C. to 150° C. and more preferably from 20° C. to 120° C. The time required for the modification reaction may vary depending on other conditions, but is preferably within 24 hours and more preferably from 0.1 hour to 10 hours.

Depending on types of the modifier, a hydroxy group, an amino group or the like may be generally in the form of an organic metal salt at a stage when the modifier has been allowed to react. In such a case, the salt can be treated with water or a compound having an active hydrogen such as alcohol to form a hydroxy group, an amino group or the like.

The hydrogenation catalyst to be used for obtaining the hydrogenated conjugated diene copolymer for use in the present invention is not particularly limited. Catalysts that can be used include previously known catalysts such as (1) supported non-uniform hydrogenation catalysts in which metals such as Ni, Pt, Pd, Ru and the like are supported on carbon, silica, alumina, diatomite and the like, (2) so called Ziegler-type hydrogenation catalysts in which transition metal salts such as organic acid salts or acetylacetone salts of Ni, Co, Fe, Cr and the like in combination with reducing agents such as organic aluminums, and (3) uniform hydrogenation catalysts such as so called organometallic complexes such as organometallic compounds of Ti, Ru, Rh, Zr and the like. Specific hydrogenation catalysts that can be used include those described in JP-B-63-4841, JP-B-01-53851 and JP-B-02-9041. Preferred hydrogenation catalysts include titanocene compounds and/or mixtures of the same with reducing organometallic compounds. Compounds described in JP-A-08-109219 can be used as the titanocene compounds. Specific examples of the same include compounds having at least one ligand with a (substituted) cyclopentadienyl skeleton such as bis(cyclopentadienyl)titanium dichloride, mono(pendamethylcyclopentadienyl) titanium trichloride and the like, an indenyl skeleton or a fluorenyl skeleton. Moreover, the reducing organometallic compounds include organic alkali metal compounds such as organolithiums, organomagnesium compounds, organoaluminum compounds, organoboron compounds, organozinc compounds or the like.

The hydrogenation reaction for obtaining the hydrogenated conjugated diene copolymer for use in the present invention is performed in a temperature range of generally from 0° C. to 200° C. and more preferably from 30° C. to 150° C. The hydrogen pressure used in the hydrogenation reaction is recommended to be from 0.1 MPa to 15 MPa, preferably from 0.2 MPa to 10 MPa, and more preferably from 0.3 MPa to 5 MPa. Moreover, the duration of the hydrogenation reaction is generally from 3 minutes to 10 hours and preferably from 10 minutes to 5 hours. The hydrogenation reaction may be performed in a batch process or in a continuous process or in combination of the two processes.

The hydrogenated polymer can be separated from the solution of the hydrogenated conjugated diene copolymer obtained as described above, catalyst residues being removed if necessary. Methods for separating a solvent can include, for example, a method in which a polymer is recovered by precipitation by adding a polar solvent such as acetone or alcohol, which is a poor solvent to the hydrogenated copolymer, to a reaction solution after the hydrogenation; a method in which a reaction solution is introduced into boiling water under stirring and a solvent is removed by steam stripping to recover a polymer; a method in which a solvent is removed by distillation by directly heating the copolymer solution, or the like.

Incidentally, stabilizers such as various phenolic stabilizers, phosphorus stabilizers, sulfur stabilizers and amine stabilizers can be added to the hydrogenated conjugated diene copolymer of the present invention.

Asphalt as the component (b) of the present invention will now be described.

Examples of asphalt that can be used in the present invention include byproducts from petroleum refining (petroleum asphalt), those obtained as natural products (natural asphalt), or mixtures thereof with petroleums. The main component of asphalt is a substance called as bitumen. Specifically, straight asphalt, semi-blown asphalt, blown asphalt, tar, pitch, cutback asphalt to which oil is added, asphalt emulsion and the like can be used. These may be mixed for use. Asphalt that is preferred in the present invention is straight asphalt with a penetration (measured according to JIS-K 2207) of from 30 to 300, preferably from 40 to 200, more preferably from 45 to 150. In the asphalt composition of the present invention, the hydrogenated conjugated diene copolymer component (a) is mixed in an amount of 0.5 part to 50 parts, preferably from 1 part to 30 parts, and more preferably from 2 parts to 20 parts by weight per 100 parts by weight of asphalt.

In the present invention, any additives may be mixed if necessary. Types of additives are not particularly limited as long as the additives are those typically used for compounding thermoplastic resins and rubber polymers. Examples of the additives include those described in "Chemicals for Rubber/Plastics" (by Rubber Digest, Co., Ltd., Japan) and the like such as inorganic fillers such as calcium carbonate, magnesium carbonate, magnesium hydroxide, . . . talc, mica, wollastonite, montmorillonite, zeolite, alumina, titanium oxide, magnesium oxide, zinc oxide, slug wool and glass fibers; pigments such as carbon black and iron oxide; lubricants, releasing agents such as stearic acid, behenic acid, zinc stearate, calcium stearate, magnesium stearate and ethylenebisstearamide; softening agents/plasticizers such as paraffinic process oils, naphthenic process oils, aromatic process oils, paraffins, organic polysiloxanes, mineral oils; antioxidants such as hindered phenol antioxidants and phosphorus heat stabilizers; hindered amine light stabilizers; benzotriazole ultraviolet light absorbers; flame retardants; antistatic agents; reinforcing agents such as organic fibers, glass fibers, carbon fibers and metal whiskers; colorants; and other additives; or mixtures thereof. The amounts of additives are not particularly limited and can be selected appropriately, but are typically 50 parts by weight or less.

The method for producing the asphalt composition of the present invention is not particularly limited. Moreover, conditions for stirring the mixture of the hydrogenated conjugated diene copolymer and asphalt are not particularly limited, but it is preferably performed at a temperature of from 160° C. to 200° C. (generally around 180° C.), and the duration of stirring is preferably from 30 minutes to 6 hours and more preferably from 1 hour to 3 hours. The rate of stirring may be appropriately selected depending on the apparatus to be used, but it is generally from 100 rpm to 8,000 rpm.

The present invention will now be described in detail with respect to examples and comparative examples, but it should be noted that the present invention is not limited by these examples.

In the examples and the comparative examples, characteristics of the hydrogenated conjugated diene copolymers and physical properties of the asphalt compositions were determined according to the following procedures.

1. Various Copolymers 1-1) Styrene Content

The content of styrene was determined by means of an ultraviolet spectrophotometer (UV-2450 made by Shimadzu Corporation) using copolymers before hydrogenation.

1-2) Content of Styrene Polymer Block

The content of styrene polymer blocks was determined by an osmium tetroxide method described in I. M. Kolthoff, et al., J. Polym. Sci., 1, 429 (1946), using copolymers before hydrogenation. The decomposition of copolymers was performed using an osmic acid solution of 0.1 g/125 ml in tert-butanol.

1-3) Vinyl Bond Content

The vinyl bond content was determined by means of an infrared spectrophotometer (name of the apparatus: FT/IR-230; made by JASCO Corporation) by a Hampton technique, using copolymers before hydrogenation.

1-4) Molecular Weight and Molecular Weight Distribution

The molecular weight and molecular weight distribution were determined by means of GPC (the apparatus is made by Waters Corporation), using copolymers before hydrogenation. Tetrahydrofuran was used as a solvent, and the measurement was performed at a temperature of 35° C. The molecular weight is the weight average molecular weight (molecular weight in terms of polystyrene), wherein the molecular weight from a peak of a chromatogram was determined by using a calibration curve obtained from the measurement of commercially available standard polystyrenes (prepared by using peak molecular weights of standard polystyrenes). The molecular weight distribution is the ratio of the obtained weight average molecular weight and number average molecular weight.

1-5) Percentage of Hydrogenation

The percentage of hydrogenation was determined by means of a nuclear magnetic resonance apparatus (DPX-400, made by BRUKER Co., Ltd.).

1-6) Peak Temperature of Loss Tangent (tan δ)

The peak temperature of loss tangent (tan δ) was determined by means of a viscoelasticity measurement and analysis apparatus (model DVE-V4 made by Rheology Co., Ltd. is used) by measuring a viscoelastic spectrum, using a frequency of 10 Hz.

1-7) Crystallization Peak and Heat of Crystallization Peak

The crystallization peak and heat of crystallization peak were determined by DSC (DSC 3200S, made by MAC Science Co., Ltd.). The temperature of copolymers was raised from room temperature to 150° C. at a rate of 30° C./minute, and then the temperature was lowered at a rate of 10° C./minute to −100° C. measuring a crystallization peak to determine the presence or absence of the crystallization peak. Furthermore, when the crystallization peak is present, the temperature where the peak occurs was defined as the crystallization peak temperature, and the heat of crystallization peak was determined.

2. Preparation of Hydrogenation Catalyst

The hydrogenation catalyst used for hydrogenation reaction was prepared according to the method as described below.

A reaction vessel purged with nitrogen was charged 2 liters of dried, purified cyclohexane, followed by dissolving 40 millimoles of bis(η5-cyclopentadienyl)titanium di-(p-tolyl) and 150 grams of 1,2-polybutadiene (a content of 1,2-vinyl bond of about 85%) with a molecular weight of about 1,000. To the mixture was added a cyclohexane solution containing 60 millimoles of n-butyllithium for the reaction at room temperature for 5 minutes. Immediately after the reaction, 40 millimoles of n-butanol was added to the reaction mixture, which was stirred and then stored at room temperature.

3. Preparation of Hydrogenated Diene Copolymer

The structure of copolymers prepared is summarized in Table 1.

<Polymer 1>

Copolymerization was performed according to the following procedure by means of a vessel type reactor with an internal space of 10 L, a stirrer and a jacket.

The reactor was charged with 10 parts by weight of cyclohexane. After the cyclohexane was adjusted to a temperature of 70° C., 0.076% by weight of n-butyllithium per weight of all monomers (the total weight of butadiene monomers and styrene monomers charged into the reactor) and 0.4 mole of N,N,N',N'-tetramethylethylenediamine (hereinafter referred to as TMEDA) per 1 mole of n-butyllithium were added, followed by addition of a cyclohexane solution containing 8 parts by weight of styrene as a monomer (monomer concentration of 22% by weight) over about 3 minutes. Then, the resulting mixture was allowed to react for 30 minutes while adjusting the temperature inside the reactor to about 70° C.

Next, a cyclohexane solution containing 48 parts by weight of butadiene and 36 parts by weight of styrene (monomer concentration of 22% by weight) was continuously supplied to the reactor at a constant speed over 60 minutes, and the mixture was allowed to react for 30 minutes while adjusting the temperature inside the reactor to about 70° C. Analysis of the polymer solution sampled immediately after the completion of the supply of monomers revealed that the polymerization conversion of butadiene was 90%; the polymerization conversion of styrene was 70%; and the content of styrene in the polymer was 43.6% by weight. The styrene content of the block B part at this time point was 36.8% by weight. Moreover, analysis of the polymer solution sampled after the completion of the reaction revealed that the polymerization conversion of butadiene was 100%; the polymerization conversion of styrene was 100%; and the content of styrene in the polymer was 47.8% by weight. The styrene content of the block B part was 42.9% by weight.

Then, a cyclohexane solution containing 8 parts by weight of styrene as a monomer (monomer concentration of 22% by weight) was added over about 3 minutes, and the resulting mixture was allowed to react for 30 minutes while adjusting the temperature inside the reactor to about 70° C., obtaining a copolymer. The resulting copolymer had a styrene content of 52% by weight, a styrene polymer block content of 16% by weight, a content of vinyl bond in the butadiene part of 21% by weight, a weight average molecular weight of 165,000, and a molecular weight distribution of 1.2.

Next, 100 ppm by weight of the above described hydrogenation catalyst in terms of titanium per weight of a copolymer was added to the obtained copolymer, and the hydrogenation reaction was performed at a hydrogen pressure of 0.7 MPa and a temperature of 65° C. After the completion of the reaction, methanol was added to the mixture, and then 0.3% by weight of octadecyl-3-(3,5-di-t-butyl-4-hydroxyphenyl) propionate per weight of the polymer was added to the mixture as a stabilizer, obtaining a hydrogenated copolymer (hereinafter referred to as polymer 1). The percentage of hydrogenation of polymer 1 was 99%. In addition, the result of the dynamic viscoelasticity measurement showed that the peak temperature of tan δ was present at −15° C. Furthermore, the result of the DSC measurement showed that the crystallization peak was absent.

<Polymer 2>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.07% by weight; the amount of styrene to be supplied at the first stage was changed to 7.5 parts by weight; the amounts of butadiene and styrene to be supplied at the second stage were changed to 59 parts and 26 parts by weight respectively; and the amount of styrene to be supplied at the third stage was changed to 7.5 parts by weight. The resulting copolymer had a styrene content of 41% by weight, a styrene polymer block content of 15% by weight, a content of vinyl bond in the butadiene part of 25% by weight, a weight average molecular weight of 177,000, and a molecular weight distribution of 1.2.

Next, the hydrogenation reaction was performed in the same manner as in Example 1 to obtain a hydrogenated copolymer (hereinafter referred to as polymer 2). The percentage of hydrogenation of polymer 2 was 98%. In addition, the result of the dynamic viscoelasticity measurement showed that the peak temperature of tan δ was present at −25° C. Furthermore, the result of the DSC measurement showed that the crystallization peak was absent.

<Polymer 3>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.085% by weight; the amount of styrene to be supplied at the first stage was changed to 9.5 parts by weight; the amounts of butadiene and styrene to be supplied at the second stage were changed to 59 parts and 22 parts by weight respectively; and the amount of styrene to be supplied at the third stage was changed to 9.5 parts by weight. The resulting copolymer had a styrene content of 41% by weight, a styrene polymer block content of 19% by weight, a content of vinyl bond in the butadiene part of 26% by weight, a weight average molecular weight of 143,000, and a molecular weight distribution of 1.2.

Next, the hydrogenation reaction was performed in the same manner as in Example 1 to obtain a hydrogenated copolymer (hereinafter referred to as polymer 3). The percentage of hydrogenation of polymer 3 was 100%. In addition, the result of the dynamic viscoelasticity measurement showed that the peak temperature of tan δ was present at −29° C. Furthermore, the result of the DSC measurement showed that the crystallization peak was absent.

<Polymer 4>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.095% by weight; the amount of styrene to be supplied at the first stage was changed to 12 parts by weight; the amounts of butadiene and styrene to be supplied at the second stage were changed to 44 parts and 36 parts by weight respectively; and the amount of styrene to be supplied at the third stage was changed to 8 parts by weight. The resulting copolymer had a styrene content of 56% by weight, a styrene polymer block content of 24% by weight, a content of vinyl bond in the butadiene part of 23% by weight, a weight average molecular weight of 135,000, and a molecular weight distribution of 1.1.

Next, the hydrogenation reaction was performed in the same manner as in Example 1 to obtain a hydrogenated copolymer (hereinafter referred to as polymer 4). The percentage of hydrogenation of polymer 4 was 93%. In addition, the result of the dynamic viscoelasticity measurement showed that the peak temperature of tan δ was present at −11° C. Furthermore, the result of the DSC measurement showed that the crystallization peak was absent.

<Polymer 5>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.14% by weight; the amount of styrene to be supplied at the first stage was changed to 18 parts by weight; the amounts of butadiene and styrene to be supplied at the second stage were changed to 56 parts and 9 parts by weight respectively; and the amount of styrene to be supplied at the third stage was changed to 17 parts by weight. The resulting copolymer had a styrene content of 44% by weight, a styrene polymer block content of 35% by weight, a content of vinyl bond in the butadiene part of 33% by weight, a weight average molecular weight of 83,000, and a molecular weight distribution of 1.1.

Next, the hydrogenation reaction was performed in the same manner as in Example 1 to obtain a hydrogenated copolymer (hereinafter referred to as polymer 5). The percentage of hydrogenation of polymer 5 was 98%. In addition, the result of the dynamic viscoelasticity measurement showed that the peak temperature of tan δ was present at −38° C. Furthermore, the result of the DSC measurement showed that the crystallization peak was absent.

<Polymer 6>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.073% by weight; the amount of styrene to be supplied at the first stage was changed to 9.5 parts by weight; the amounts of butadiene and styrene to be supplied at the second stage were changed to 59 parts and 22 parts by weight respectively; and the amount of styrene to be supplied at the third stage was changed to 9.5 parts by weight. The resulting copolymer had a styrene content of 41% by weight, a styrene polymer block content of 19% by weight, a content of vinyl bond in the butadiene part of 29% by weight, a weight average molecular weight of 168,000, and a molecular weight distribution of 1.2.

Next, the hydrogenation reaction was performed in the same manner as in Example 1 to obtain a hydrogenated copolymer (hereinafter referred to as polymer 6). The percentage of hydrogenation of polymer 6 was 75%. In addition, the result of the dynamic viscoelasticity measurement showed that the peak temperature of tan δ was present at −31° C. Furthermore, the result of the DSC measurement showed that the crystallization peak was absent.

<Polymer 7>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.075% by weight; the amount of styrene to be supplied at the first stage was changed to 3 parts by weight; the amounts of butadiene and styrene to be supplied at the second stage were changed to 59 parts and 37 parts by weight respectively; and the amount of styrene to be supplied at the third stage was changed to 1 part by weight. The resulting copolymer had a styrene content of 41% by weight, a styrene polymer block content of 4% by weight, a content of vinyl bond in the butadiene part of 27% by weight, a weight average molecular weight of 173,000, and a molecular weight distribution of 1.2.

Next, the hydrogenation reaction was performed in the same manner as in Example 1 to obtain a hydrogenated copolymer (hereinafter referred to as polymer 7). The percentage of hydrogenation of polymer 7 was 99%. In addition, the result of the dynamic viscoelasticity measurement showed that the peak temperature of tan δ was present at −18° C. Furthermore, the result of the DSC measurement showed that the crystallization peak was absent.

<Polymer 8>

A copolymer was obtained in the same manner as in the case of polymer 1 by changing the amount of monomers and the like to be supplied to the reactor.

Specifically, the polymerization was performed in the same manner except that the amount of n-butyllithium to be supplied was changed to 0.090% by weight; the amount of styrene to be supplied at the first stage was changed to 5 parts by weight; the amounts of butadiene and styrene to be supplied at the second stage were changed to 71 parts and 19 parts by weight respectively; and the amount of styrene to be supplied at the third stage was changed to 5 parts by weight. The resulting copolymer had a styrene content of 29% by weight, a styrene polymer block content of 10% by weight, a content of vinyl bond in the butadiene part of 30% by weight, a weight average molecular weight of 125,000, and a molecular weight distribution of 1.1.

Next, the hydrogenation reaction was performed in the same manner as in Example 1 to obtain a hydrogenated copolymer (hereinafter referred to as polymer 8). The percentage of hydrogenation of polymer 8 was 93%. In addition, the result of the dynamic viscoelasticity measurement showed that the peak temperature of tan δ was present at −33° C. Furthermore, the result of the DSC measurement showed that the crystallization peak was absent.

<Polymer 9>

A non-hydrogenated copolymer was continuously polymerized according to the following procedure by means of two vessel type reactors each with an internal space of 10 liters, a stirrer and a jacket.

The continuous polymerization was performed at 90° C. by supplying a cyclohexane solution with a concentration of butadiene of 24% by weight at 4.51 liters/hr, a cyclohexane solution with a concentration of styrene of 24% by weight at 6.47 liters/hr, and a cyclohexane solution of n-butyllithium at 2.0 liters/hr, wherein the concentration of n-butyllithium was adjusted so that the amount of n-butyllithium was 0.077 parts by weight per 100 parts by weight of monomers (the sum of the amounts of butadiene and styrene), each to the bottom of the first reactor, and further supplying a cyclohexane solution of TMEDA at a supply rate such that the amount of TMEDA is 0.44 mole per one mole of n-butyllithium. The reaction temperature was adjusted by a jacket temperature. The temperature around the bottom of the reactor was about 88° C., and the temperature around the top of the reactor was about 90° C. The average residence time in the polymerization reactor was 45 minutes, and the conversion of butadiene and styrene was almost 100% and 99%, respectively.

The polymer solution from the first reactor was supplied to the bottom of the second reactor, and at the same time a cyclohexane solution of a concentration of styrene of 24% by weight was supplied to the bottom of the second reactor at a supply rate of 2.28 liters/hr to continuously polymerize the mixture at 90° C. to obtain a copolymer. The conversion of styrene at the exit of the second reactor was 98%.

Analysis of the copolymer obtained in the continuous polymerization revealed that the copolymer had a styrene content of 70% by weight, a polystyrene block content of 21% by weight, a content of vinyl bond in the butadiene part of 18% by weight, a weight average molecular weight of 180,000, and a molecular weight distribution of 1.9.

Next, 100 ppm of the hydrogenation catalyst in terms of titanium per 100 parts by weight of a copolymer was added to the copolymer obtained in the continuous polymerization, and the hydrogenation reaction was performed at a hydrogen pressure of 0.7 MPa and a temperature of 65° C. After the completion of the reaction, methanol was added to the mixture, and then 0.3 parts by weight of octadecyl-3-(3,5-di-t-butyl-4-hydroxyphenyl)propionate per 100 parts by weight of the polymer was added to the mixture as a stabilizer, obtaining a hydrogenated copolymer (polymer 9). The percentage of hydrogenation of polymer 9 was 99%. In addition, the result of the viscoelasticity measurement showed that the peak of tan δ was present at 15° C. Furthermore, the result of the DSC measurement showed that the crystallization peak was absent.

<Polymer 10>

Polymer 10 was prepared in the same manner as according to the procedures for preparing polymer 3 except that the hydrogenation reaction was not performed.

<Polymer 11>

G1652 (available from Kraton Polymers, United States)

4. Preparation of Asphalt Composition

Asphalt compositions were prepared according to the following procedures in Examples 1 to 10 and Comparative Examples 1 to 10.

A metal can of 750 milliliters was charged with 400 g of straight asphalt 60-80 (available from Nippon Oil Corporation, Japan), and the can was fully immersed in an oil bath at 180° C. Next, a specified amount of a hydrogenated diene copolymer was gradually charged while stirring into the molten asphalt. After the completion of the charge, the mixture was stirred at a rotation speed of 5,000 rpm for 90 minutes to prepare an asphalt composition.

5. Characteristics of Asphalt Composition 5-1) Softening Point (Ring & Ball Method)

The softening point of a composition was determined according to JIS-K 2207. A specimen was filled in a defined ring, which was supported horizontally in a glycerin liquid. A ball of 3.5 g was placed on the specimen at the center thereof, and the temperature of the liquid was raised at a rate of 5° c./minute. The temperature at which the specimen was brought into contact with a bottom plate of a ring base by the weight of the ball was measured.

5-2) Melt Viscosity

The melt viscosity was measured with a Brookfield viscometer at 160° C.

5-3) Penetration

The penetration of a composition was determined according to JIS-K 2207. The length of penetration of a defined needle in 5 seconds into a specimen, which was held at 25° C. in a constant-temperature water bath, was measured.

5-4) Elongation

The elongation of a composition was determined according to JIS-K 2207. A specimen was poured into a form and formed into a defined shape, and then held at 15° C. in a constant-temperature water bath. The distance of elongation of the specimen until it broke, when it was elongated at a rate of 5 cm/minute, was measured.

5-5) Modulus

The dynamic viscoelasticity was measured with a dynamic shear rheometer. The expression: Modulus=G*/tan δ was determined from the complex modulus (G*) and loss tangent (tan δ) obtained from the measurement as an index for evaluating the performance of a binder to the rutting. Specifically, the measurement apparatus and measurement conditions are as follows:

Measurement apparatus: ARES made by Rheometric Scientific, Inc.
Measurement conditions
Measurement temperature: 60° C.
Angular velocity: 10 rad/sec
Measurement mode: parallel plate (diameter 50 mmΦ)
Sample quantity: 2 g 5-6) High Temperature Storage Stability (Separation Characteristics)

Immediately after production of an asphalt composition, the asphalt composition was poured into an aluminum can with an inner diameter of 50 mm and a height of 130 mm to the upper limit of the aluminum can and heated for 24 hours in an oven at 180° C. Subsequently, the aluminum can was removed for natural cooling. Next, specimens of the asphalt composition cooled to room temperature were collected each from the lower layer part ranging from the bottom to 4 cm above the bottom and the upper layer part ranging from the top to 4 cm below the top. The softening point each for the upper layer part and the lower layer part was determined, and the difference of the softening point values for the two specimens was adopted as a measure of the high temperature storage stability. The smaller the difference of the softening point values is, the better the high temperature storage stability is.

EXAMPLES 1 TO 4

Polymers 1, 2, 3 and 6 were used as the hydrogenated copolymer, and materials and the formulation (copolymer content is 3.5%) described in Table 2-1 were used to obtain asphalt compositions. Characteristics thereof are shown in Table 2-1.

COMPARATIVE EXAMPLES 1 TO 5

Polymers 7 to 11 were used as the hydrogenated copolymer, and materials and the formulation (copolymer content is 3.5%) described in Table 2-2 were used to obtain asphalt compositions. Characteristics thereof are shown in Table 2-2.

EXAMPLES 5 TO 10

Polymers 1 to 6 were used as the hydrogenated copolymer, and materials and the formulation (copolymer content is 8.0%) described in Table 2-3 were used to obtain asphalt compositions. Characteristics thereof are shown in Table 2-3.

COMPARATIVE EXAMPLES 6 TO 10

Polymers 7 to 11 were used as the hydrogenated copolymer, and materials and the formulation (copolymer content is 8.0%) described in Table 2-4 were used to obtain asphalt compositions. Characteristics thereof are shown in Table 2-4.

INDUSTRIAL APPLICABILITY

The asphalt composition of the present invention has high softening point, modulus and elongation and is excellent in high-temperature storage stability. In particular, the asphalt composition has an extremely high softening point and modulus even when it contains a low content of the hydrogenated copolymer. Therefore, the use of expensive modified polymers can be reduced, providing an extremely high industrial utility value. Furthermore, the asphalt composition has excellent high-temperature storage stability even when it contains a high content of the hydrogenated copolymer. The asphalt composition of the present invention can be suitably utilized for road pavement, roofings/waterproof sheets and sealants, by making the most of such characteristics. In addition, the asphalt composition is very suitable for roofing shingles since it is also excellent in weatherability in addition to the above characteristics.

TABLE 1

Structure of hydrogenated copolymer

| | Structure of copolymer | | | | | | |
|---|---|---|---|---|---|---|---|
| | Styrene content (wt %) | Styrene block content (wt %) | B-part vinyl content (wt %) | Weight average molecular weight (10 thousands) | Molecular weight distribution (Mw/Mn) | Percentage of hydrogenation (%) | tan δ peak (° C.) |
| Polymer 1 | 52 | 16 | 21 | 16.5 | 1.2 | 99 | −15 |
| Polymer 2 | 41 | 15 | 25 | 17.7 | 1.2 | 98 | −25 |
| Polymer 3 | 41 | 19 | 26 | 14.3 | 1.2 | 100 | −29 |
| Polymer 4 | 56 | 24 | 23 | 13.5 | 1.1 | 93 | −11 |
| Polymer 5 | 44 | 35 | 33 | 8.3 | 1.1 | 98 | −38 |
| Polymer 6 | 41 | 19 | 29 | 16.8 | 1.2 | 75 | −31 |
| Polymer 7 | 41 | 4 | 27 | 17.3 | 1.2 | 99 | −18 |
| Polymer 8 | 29 | 10 | 30 | 12.5 | 1.1 | 93 | −33 |
| Polymer 9 | 70 | 21 | 18 | 18.0 | 1.9 | 99 | +15 |
| Polymer 10 | 41 | 19 | 26 | 14.3 | 1.2 | 0 | −32 |
| Polymer 11 | 30 | 30 | — | 8.7 | 1.0 | 100 | −45 |

TABLE 2-1

Characteristics of asphalt compositions (low polymer content: 3.5%)

| | | Example 1 | Example 2 | Example 3 | Example 4 |
|---|---|---|---|---|---|
| Components | Type of hydrogenated copolymers | Polymer 1 | Polymer 2 | Polymer 3 | Polymer 6 |
| | Asphalt | Nippon Oil straight asphalt 60-80 | | | |
| Physical properties | Softening point (° C.) | 63 | 77 | 79 | 69 |
| | Melt viscosity (cp) (160° C.) | 380 | 500 | 400 | 380 |
| | Penetration (1/10 mm) | 43 | 41 | 40 | 47 |
| | Elongation (cm) (15° C.) | 100 | 80 | 80 | 90 |
| | Modulus (Pa) (60° C.) | 1330 | 1610 | 1500 | 1300 |

TABLE 2-2

Characteristics of asphalt compositions (low polymer content: 3.5%)

| | | Comparative Example 1 | Comparative Example 2 | Comparative Example 3 | Comparative Example 4 | Comparative Example 5 |
|---|---|---|---|---|---|---|
| Components | Type of hydrogenated copolymers | Polymer 7 | Polymer 8 | Polymer 9 | Polymer 10 | Polymer 11 |
| | Asphalt | Nippon Oil straight asphalt 60-80 | | | | |
| Physical properties | Softening point (° C.) | 50 | 52 | 56 | 52 | 53 |
| | Melt viscosity (cp) (160° C.) | 480 | 340 | 380 | 320 | 310 |
| | Penetration (1/10 mm) | 40 | 41 | 48 | 55 | 49 |
| | Elongation (cm) (15° C.) | 100 | 100 | 50 | 100 | 20 |
| | Modulus (Pa) (60° C.) | 1500 | 1110 | 1120 | 1000 | 1000 |

TABLE 2-3

Characteristics of asphalt compositions (high polymer content: 8.0%)

|  |  | Example 5 | Example 6 | Example 7 | Example 8 | Example 9 | Example 10 |
|---|---|---|---|---|---|---|---|
| Components | Type of hydrogenated copolymers | Polymer 1 | Polymer 2 | Polymer 3 | Polymer 4 | Polymer 5 | Polymer 6 |
|  | Asphalt | Nippon Oil straight asphalt 60-80 | | | | | |
| Physical properties | Softening point (° C.) | 83 | 89 | 90 | 87 | 102 | 92 |
|  | High-temperature storage stability <difference of softening point (° C.)> | 1 | 2 | 3 | 1 | 2 | 2 |
|  | Melt viscosity (cp) (160° C.) | 1730 | 2800 | 1830 | 960 | 710 | 1740 |
|  | Penetration (1/10 mm) | 35 | 30 | 29 | 31 | 29 | 28 |
|  | Elongation (cm) (15° C.) | 40 | 41 | 40 | 47 | 51 | 45 |
|  | Modulus (Pa) (60° C.) | 5660 | 7300 | 7000 | 4800 | 4000 | 6500 |

TABLE 2-4

Characteristics of asphalt compositions (high polymer content: 8.0%)

|  |  | Comparative Example 6 | Comparative Example 7 | Comparative Example 8 | Comparative Example 9 | Comparative Example 10 |
|---|---|---|---|---|---|---|
| Components | Type of hydrogenated copolymers | Polymer 7 | Polymer 8 | Polymer 9 | Polymer 10 | Polymer 11 |
|  | Asphalt | Nippon Oil straight asphalt 60-80 | | | | |
| Physical properties | Softening point (° C.) | 65 | 66 | 80 | 77 | 90 |
|  | High-temperature storage stability <difference of softening point (° C.)> | 4 | 4 | 3 | 15 | 20 |
|  | Melt viscosity (cp) (160° C.) | 3200 | 3000 | 1480 | 420 | 770 |
|  | Penetration (1/10 mm) | 37 | 30 | 38 | 40 | 32 |
|  | Elongation (cm) (15° C.) | 120 | 60 | 32 | 60 | 40 |
|  | Modulus (Pa) (60° C.) | 7000 | 2400 | 4460 | 1700 | 4900 |

The invention claimed is:

1. An asphalt composition comprising from 0.5 to 50 parts by weight of a hydrogenated conjugated diene copolymer (a) and 100 parts by weight of asphalt (b), wherein the hydrogenated conjugated diene copolymer (a) is obtained by hydrogenation of a non-hydrogenated conjugated diene copolymer obtained by anion living polymerization of a conjugated diene monomer and a vinyl aromatic monomer using an organic alkali metal compound as a catalyst, and wherein the hydrogenated conjugated diene copolymer (a) comprises at least two homopolymer blocks (A) comprising vinyl aromatic monomer units and at least one hydrogenated copolymer block (B) obtained by hydrogenation of a non-hydrogenated random copolymer block comprising conjugated diene monomer units and vinyl aromatic monomer units, within the hydrogenated copolymer block (B), the weight ratio of the conjugated diene monomer units/the vinyl aromatic monomer units is from 53/47 to 80/20, the homopolymer block (A) and the hydrogenated copolymer block (B) both comprise a styrene chain, the styrene chains constituting the homopolymer block (A) and the hydrogenated copolymer block (B) are atactic, and the hydrogenated conjugated diene copolymer (a) has the following characteristics (1) to (5):

(1) the content of the vinyl aromatic monomer units is more than 30% and not more than 60% by weight per weight of the hydrogenated conjugated diene copolymer (a);

(2) the content of the homopolymer block (A) is from 5% to 50% by weight per weight of the hydrogenated conjugated diene copolymer (a);

(3) the weight average molecular weight is from 30,000 to 500,000;

(4) the percentage of hydrogenation of the double bonds in the conjugated diene monomer units is from 60% to 100%; and (5) at least one peak of the loss tangent (tan δ) is present in the range of from −40° C. to less than −10° C. in a dynamic viscoelastic spectrum obtained with respect to the hydrogenated conjugated diene copolymer (a).

2. The asphalt composition according to claim 1, wherein said hydrogenated conjugated diene copolymer (a) does not substantially have a crystallization peak in the range of from −20° C. to 80° C. in the chart of differential scanning calorimetry (DSC).

3. The asphalt composition according to claim 1, wherein the content of the vinyl aromatic monomer units in said hydrogenated conjugated diene copolymer (a) is more than 40% and not more than 60% by weight per weight of the hydrogenated conjugated diene copolymer (a).

4. The asphalt composition according to claim 1, wherein the hydrogenated copolymer block (B) in said hydrogenated conjugated diene copolymer (a) is a hydrogenated copolymer block obtained by hydrogenation of a non-hydrogenated random copolymer block with a tapered structure.

5. The asphalt composition according to claim 1, wherein the hydrogenated conjugated diene copolymer (a) has a molecular weight distribution (Mw/Mn) of from 1.1 to 5.

6. The asphalt composition according to claim 1, wherein the hydrogenated conjugated diene copolymer (a) is a modified hydrogenated copolymer having an atom to which a functional group is bonded.

7. The asphalt composition according to claim 1 for use in a roofing shingle.

8. The asphalt composition according to claim 1, wherein the weight ratio of the conjugated diene monomer units/the vinyl aromatic monomer units is from 56/44 to 75/25.

9. An asphalt composition comprising from 0.5 to 50 parts by weight of a hydrogenated conjugated diene copolymer (a) and 100 parts by weight of asphalt (b), wherein the hydrogenated conjugated diene copolymer (a) is obtained by hydrogenation of a non-hydrogenated conjugated diene copolymer obtained by anion living polymerization of a conjugated diene monomer and a vinyl aromatic monomer using an organic alkali metal compound as a catalyst, and then using a tertiary amine compound and/or an ether compound as a modifier for adjusting random copolymerization between the conjugated diene and the vinyl aromatic compound, and wherein the hydrogenated conjugated diene copolymer (a) comprises at least two homopolymer blocks (A) having an average degree of polymerization greater than 30 and comprising vinyl aromatic monomer units, and at least one hydrogenated copolymer block (B) obtained by hydrogenation of a non-hydrogenated random copolymer block comprising conjugated diene monomer units and vinyl aromatic monomer units, within the hydrogenated copolymer block (B), the weight ratio of the conjugated diene monomer units/the vinyl aromatic monomer units is from 53/47 to 80/20, the homopolymer block (A) and the hydrogenated copolymer block (B) both comprise a styrene chain, the styrene chains constituting the homopolymer block (A) and the hydrogenated copolymer block (B) are atactic, and the hydrogenated conjugated diene copolymer (a) has the following characteristics (1) to (5):

(1) the content of the vinyl aromatic monomer units is more than 30% and not more than 60% by weight per weight of the hydrogenated conjugated diene copolymer (a);

(2) the content of the homopolymer block (A) is from 5% to 50% by weight per weight of the hydrogenated conjugated diene copolymer (a);

(3) the weight average molecular weight is from 30,000 to 500,000;

(4) the percentage of hydrogenation of the double bonds in the conjugated diene monomer units is from 60% to 100%; and (5) at least one peak of the loss tangent (tan δ) is present in the range of from −40° C. to less than −10° C. in a dynamic viscoelastic spectrum obtained with respect to the hydrogenated conjugated diene copolymer (a).

10. The asphalt composition of claim 9, wherein a tertiary amine compound and/or an ether compound is used as a modifier for adjusting random copolymerization between the conjugated diene monomer units and the vinyl aromatic monomer units.

11. An asphalt composition comprising from 0.5 to 50 parts by weight of a hydrogenated conjugated diene copolymer (a) and 100 parts by weight of asphalt (b), wherein the hydrogenated conjugated diene copolymer (a) is obtained by hydrogenation of a non-hydrogenated conjugated diene copolymer obtained by anion living polymerization of a conjugated diene monomer and a vinyl aromatic monomer using a catalyst system consisting essentially of aliphatic and/or aromatic hydrocarbon lithium compounds having from 1 to 20 carbon atoms, and wherein the hydrogenated conjugated diene copolymer (a) comprises at least two homopolymer blocks (A) comprising vinyl aromatic monomer units and at least one hydrogenated copolymer block (B) obtained by hydrogenation of a non-hydrogenated random copolymer block comprising conjugated diene monomer units and vinyl aromatic monomer units, within the hydrogenated copolymer block (B), the weight ratio of the conjugated diene monomer units/the vinyl aromatic monomer units is from 53/47 to 80/20, the homopolymer block (A) and the hydrogenated copolymer block (B) both comprise a styrene chain, the styrene chains constituting the homopolymer block (A) and the copolymer block (B) are atactic, and the hydrogenated conjugated diene copolymer (a) has the following characteristics (1) to (5):

(1) the content of the vinyl aromatic monomer units is more than 30% and not more than 60% by weight per weight of the hydrogenated conjugated diene copolymer (a);

(2) the content of the homopolymer block (A) is from 5% to 50% by weight per weight of the hydrogenated conjugated diene copolymer (a);

(3) the weight average molecular weight is from 30,000 to 500,000;

(4) the percentage of hydrogenation of the double bonds in the conjugated diene monomer units is from 60% to 100%; and (5) at least one peak of the loss tangent (tan δ) is present in the range of from −40° C. to less than −10° C. in a dynamic viscoelastic spectrum obtained with respect to the hydrogenated conjugated diene copolymer (a).

12. The asphalt composition of claim 11, wherein homopolymer block (A) has an average degree of polymerization greater than 30.

13. The asphalt composition of claim 11, wherein after anion living polymerization, a modifier is used for adjusting random copolymerization between the conjugated diene and the vinyl aromatic compound, and the modifier is a tertiary amine compound and/or an ether compound.

14. The asphalt composition of claim 11, wherein the catalyst system consists essentially of n-butyllithium.

* * * * *

UNITED STATES PATENT AND TRADEMARK OFFICE
CERTIFICATE OF CORRECTION

PATENT NO. : 7,696,267 B2  Page 1 of 1
APPLICATION NO. : 11/727839
DATED : April 13, 2010
INVENTOR(S) : Masahiro Sasagawa et al.

It is certified that error appears in the above-identified patent and that said Letters Patent is hereby corrected as shown below:

In the Specifications:
Column 1, Lines 10-12, after "its entirety." delete "This continuation application claims the priority of the parent U.S. patent application Ser. No. 10/968,241."

Signed and Sealed this

Twenty-third Day of November, 2010

David J. Kappos
*Director of the United States Patent and Trademark Office*